May 18, 1965 KINICHI NISHIOKA ET AL 3,183,646
METHOD OF SEPARATION OF ACETYLENE AND ETHYLENE
FROM A GASEOUS MIXTURE
Filed Oct. 2, 1961

3,183,646
METHOD OF SEPARATION OF ACETYLENE AND ETHYLENE FROM A GASEOUS MIXTURE

Kinichi Nishioka and Yukiyoshi Kan, Kurashiki, Japan, assignors to Kurashi Rayon Company Limited, Kurashiki, Japan, a corporation of Japan
Filed Oct. 2, 1961, Ser. No. 142,081
Claims priority, application Japan, Oct. 14, 1960, 35/41,216
1 Claim. (Cl. 55—51)

This invention relates to a method of separation of acetylene and ethylene from a gaseous mixture obtained by the decomposition of hydrocarbons, by previously absorbing and separating acetylene at room temperature in an acetylene absorbing solvent having a boiling point higher than 100° C., and subsequently separating ethylene at the said low temperature in a hypersorber (a moving bed type adsorption separator).

The object of the invention is to provide a most economical method for carrying out the method for separating acetylene and ethylene from a gaseous mixture obtained by the decomposition of hydrocarbons at a temperature above 1000° C.

Figure 1:
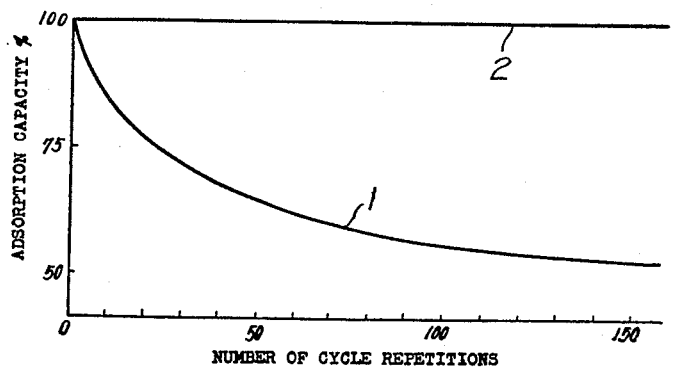
Figure 2:
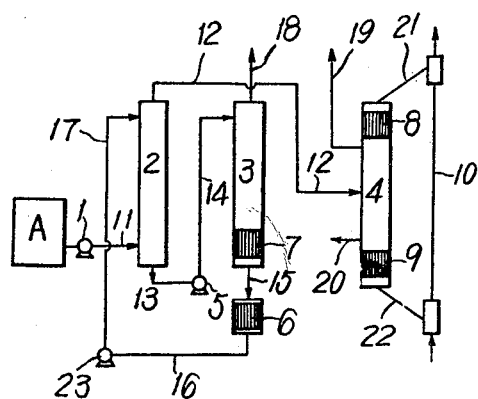

For a better understanding of the invention reference is made to the accompanying drawings, in which FIG. 1 shows a curve for illustrating values of adsorption capacity ratio (percent) as a function of circulation frequency of the adsorbent to be used in the method of the invention; and FIG. 2 shows a flow-sheet diagram of an embodiment of the invention.

Acetylene or ethylene are generally produced by thermal or electrical decomposition of hydrocarbons at a temperature above 1000° C., and a method of simultaneously producing both acetylene and ethylene has recently been requested commercially. This is mainly due to the fact that the simultaneous production of acetylene and ethylene has economical advantages over that of each independent production.

A gaseous mixture containing acetylene and ethylene at an arbitrary ratio may be obtained by the decomposition of hydrocarbons under suitable conditions. As a method of separation and refining of acetylene and ethylene from the mixture, the method of super-refrigeration will be mentioned in the first place. In this method, acetylene and ethylene can be separated by liquefaction; but acetylene in the liquid state is so unstable and explosive that it must be absorbed in an acetylene absorbent under such a condition that it is not yet liquefied while it is subjected to a high pressure and super-refrigeration; then the mixture is subjected to still higher pressure and refrigeration so that ethylene may be liquefied to be separated. In this method, it is necessary to cool the mixture to such an extremely low temperature of −80° C. to −140° C., so that a considerable amount of investment and high power cost are required for the refrigerating installation and for its operation, which corresponds to a considerable part of the production cost of acetylene and ethylene.

The method of separation by adsorbing hydrocarbons in an adsorbent is known, and one of the most improved methods is a moving bed type adsorption separation known as hypersorption process. According to this method hydrocarbons are adsorbed in an adsorbent which flows downward through a tower by gravity and are desorbed to be separated at the bottom of the tower by heating. The adsorbent freed from the adsorbed hydrocarbons is cooled down and recycled to the top of the tower to flow downward again through the tower. From a thermally or electrically decomposed hydrocarbon mixture containing acetylene and ethylene said gases can be separted at about room temperature with a hypersorber (a moving bed adsorption separator). But when the above mentioned decomposed gases are adsorbed by using an adsorbent, the lowering of the adsorption capacity is so remarkable as shown by curve 1 in FIG. 1, that it makes economical separation of acetylene and ethylene impracticable. From the foregoing description, it will be apparent that the known methods of separating acetylene and ethylene from a gaseous mixture have many disadvantages.

The invention is to obviate the above disadvantages and is characterised in that in case of separating acetylene and ethylene from a gaseous mixture obtained by the decomposition of hydrocarbons, acetylene is first absorbed and separated at a temperature of 0° C. to 30° C. in an absorbent of which the boiling point is higher than 100° C., and then ethylene is separated by means of a hypersorber (a moving bed absorption separator) at a temperature of 0° C. to 30° C.

Thus, it has been made clear that the combination of the method of absorbing in a solvent and of adsorbing separation of the invention provides the most excellent results which have never been expected by the heretofore known methods. According to the method of the invention acetylene is absorbed at about room temperature so that the solvent should have a low vapor tension at the absorbing temperature and little evaporation loss while it is used, accordingly its boiling point under atmospheric pressure is desirable to be higher than 100° C.

The inventors have ascertained that when the above mentioned decomposed gaseous mixture from which acetylene is removed by a typical acetylene absorbent of dimethyl formamide (hereafter abridged as D.M.F.) is treated by a hypersorption method, the attenuation of the adsorbing capacity of the adsorbent is remarkably reduced as shown by the curve 2 in FIG. 1 and the hypersorption operation can be continued with negligible consumption of the adsorbent; as absorbents, n-methyl, pyrrolidone, γ-butyrolactone, dimethyl acetamide and dimethyl sulfoxide have the same effect as D.M.F.

Accordingly acetylene and ethylene can be economically separated and refined from a gaseous mixture containing both of them without subjecting it to super-refrigeration by combining the processes of separating acetylene with an acetylene absorbent and the process of hypersorption separation of ethylene.

A practical example for carrying out the invention is explained with reference to FIG. 2. The composition of the decomposed gaseous elements obtained from the decomposing apparatus A at a temperature above 1000° C. is shown in the following:

| Gaseous elements: | Volume percent |
|---|---|
| Acetylene | 9.5 |
| Ethylene | 12.2 |
| Methane | 19.2 |
| Carbon monoxide | 11.13 |
| Nitrogen | 7.0 |
| Carbon dioxide | 1.2 |
| Hydrogen | 39.0 |
| Methyl acetylene (propadyne) | 0.37 |
| Diacetylene | 0.07 |
| Ethyl acetylene (butadyne) | 0.07 |
| Vinyl acetylene | 0.26 |

The decomposed gas is compressed to a required pressure by the compressor 1, and is delivered through the pipe 11 into the acetylene absorbing tower 2, wherein it makes counter flow contact with D.M.F. at room temperature which is delivered from the pump 23 through the pipe 17 into the tower from its top and it goes out of the top of the tower into the pipe 12 after the acetylene has been absorbed leaving only a trace amount thereof unabsorbed. The composition of the gas at this time is as follows:

| Gaseous elements: | Volume percent |
|---|---|
| Ethylene | 12.6 |
| Methane | 21.2 |
| Carbon monoxide | 13.5 |
| Nitrogen | 7.7 |
| Carbon dioxide | 1.5 |
| Hydrogen | 43.5 |

On the other hand, the D.M.F. which absorbed acetylene is sucked by the pump 5 through the pipe 13 and delivered to the acetylene separating tower 3 through the pipe 14. The tower 3 is kept at atmospheric pressure and equipped with a heater 7 at its bottom, in which acetylene is heated to a temperature of the boiling point of D.M.F. and is separated from D.M.F. The acetylene thus separated is delivered through the pipe 18; the D.M.F. is withdrawn through the pipe 15, cooled down to room temperature through the cooler 6, sucked by the pump 23 through the pipe 16, and reused. Part of D.M.F. can be taken out in a side flow to be refined. The composition of the gaseous components coming out from the pipe 18 is as follows:

| Gaseous components: | Volume percent |
|---|---|
| Acetylene | 90.6 |
| Carbon dioxide | 2.1 |
| Ethylene | 0.5 |
| Methyl acetylene (propadyne) | 3.5 |
| Diacetylene | 0.7 |
| Vinyl acetylene | 2.5 |
| Ethyl acetylene (butadyne) | 0.10 |

The acetylene gas can be refined further by a usual refining method of washing with an aqueous solution of NaOH or sulphuric acid.

The gas going out of the top of the absorption tower 2 is delivered into the hypersorber 4 through the pipe 12, wherein active carbon goes down through the tower at a constant speed adsorbing ethylene from the gaseous mixture which latter is heated by the heater at the bottom to desorb ethylene, then the desorbed ethylene is taken out through the pipe 20. The active carbon freed from the adsorbed ethylene is passed through the pipe 22, and lifted up by means of the lift 10 to the top of the tower 4, where it is delivered into the hypersorber through the pipe 21. The active carbon is cooled down to room temperature by the cooler 8 provided at the top of the tower, and then passes down through the tower again. The decomposed gas components of hydrogen, nitrogen, carbon dioxide, carbon monoxide and methane etc., are separated from ethylene according to the difference in quantities adsorbed by the activated carbons and discharged through the pipe 19. The gas taken from the pipe 20 contains more than 99% of ethylene.

Ethylene of higher purity can be obtained by side-cutting ethylene at a proper point of the hypersorber 4.

The composition of the gaseous components released from the pipe 19 is as follows:

| Gaseous components: | Volume percent |
|---|---|
| Hydrogen | 49.2 |
| Methane | 24.0 |
| Carbon monoxide | 15.3 |
| Carbon dioxide | 1.7 |
| Nitrogen | 8.8 |

It is advantageous to carry out the method of the invention under pressure preferably of about 3 to 15 atm. considering the fact that the starting gas contains acetylene, thereby reducing the size of the apparatus.

The invention will be explained by the following examples:

Example 1

Propane gas was passed at a rate of 27 m.$^3$/hr. together with steam at a rate of 54 m.$^3$/hr. and a diluent gas of 54 m.$^3$/hr. through a regenerative furnace to be decomposed at a temperature of 1,200° C. under a pressure of ½ atm., and the decomposed gas was obtained at a rate of 130 m.$^3$/hr. The contents of acetylene and ethylene in the gas were 9.5% and 12.2% respectively. The decomposed gas was then compressed to 10 atm. and was contacted by counterflow with D.M.F. at 20° C. which was flowing at a rate of 550 l./hr. in a packed tower of 10 m. in height and 0.5 m. in diameter, and the result showed that the total quality of acetylene could be absorbed. The D.M.F. which absorbed acetylene was heated to its boiling point by high pressure steam in a packed tower of 10 m. in height and 0.5 m. in diameter, and acetylene having a purity of 90% was obtained at a rate of 13.5 m.$^3$/hr. The heated D.M.F. was then cooled down to room temperature and reused in cycle operation. The gas freed of acetylene was delivered to a hypersorber of 10 m. in height and 0.5 m. in diameter, equipped with a cooler of 20° C. at the top and a heater of 150° C. at the lower part, in which active carbon of 10 meshes in size circulated at a rate of 1,040 l./hr.; ethylene having a purity of 99% was obtained from the bottom at a rate of 15.6 m.$^3$/hr. and the gas entirely free of ethylene was withdrawn from the top at a rate of 100 m.$^3$/hr. In this way the plant was operated continuously for 100 days, but the lowering of the adsorbing capacity of the active carbon was less than 1% so that almost no decrease in the capacity was observed.

Example 2

Fuel gas at a rate of 75 m.$^3$/hr., oxygen of 45 m.$^3$/hr. and raw material of naphtha of 65 kg./hr. were fed in a flame decomposition furnace operated at a temperature of 1250° C., and a decomposed gas of 140 m.$^3$/hr. was obtained. The contents of acetylene and ethylene in the gas were 8.0% and 12.2% respectively. These gases were treated in the same way as in Example 1, and acetylene having a purity of 90% was obtained at a rate of 12.1 m.$^3$/hr., and ethylene of 95% purity at a rate of 17.0 m.$^3$/hr. A decrease of the adsorbing capacity of the active carbon in the hypersorber, however, was not observed at all.

What we claim is:

A method of recovering acetylene and ethylene from a gaseous mixture obtained by the decomposition of hydrocarbons at temperatures above 1000° C. and containing minor amounts of butadyne, diacetylene, methyl acetylene, and vinyl acetylene, as impurities, which method comprises contacting said gaseous mixture first in an absorption zone at a temperature of 0° C. to 30° C. with an absorbent liquid selected from the group consisting of dimethyl formamide, dimethyl acetamide, dimethyl sulfoxide, n-methyl pyrrolidone and j-butyrolactone and absorbing substantially all of the acetylene and said impurities in said absorbent liquid, removing from said absorption zone said absorbent liquid with said absorbed impurities and absorbed acetylene to a desorption zone and heating said absorbent liquid at a temperature sufficient to recover acetylene, passing the residual unabsorbed gases containing ethylene from said absorption zone at a temperature of 0° to 30° C. through a hypersorber, contacting therein said residual gases with a moving solid adsorbent in an adsorption zone and preferentially adsorbing ethylene on said adsorbent, moving asid adsorbent containing adsorbed ethylene to a desorption zone, heating said adsorbent in said desorption zone to a temperature sufficient to desorb ethylene thereby desorbing ethylene therefrom, and recovering said ethylene.

References Cited by the Examiner

UNITED STATES PATENTS

| | | | |
|---|---|---|---|
| 2,146,448 | 2/39 | Scott et al. | 55—65 X |
| 2,753,012 | 7/56 | Thodos et al. | 55—65 X |
| 2,909,038 | 10/59 | Williams et al. | 55—64 X |
| 3,071,912 | 1/63 | Akin | 55—64 |

OTHER REFERENCES

Kehde et al.: Ethylene Recovery Commercial Hypersorption Operation, in Chem. and Engr. Prog. 44 (8), pp. 575–582, August 1948.

REUBEN FRIEDMAN, *Primary Examiner.*

UNITED STATES PATENT OFFICE
CERTIFICATE OF CORRECTION

Patent No. 3,183,646                           May 18, 1965

Kinichi Nishioka et al.

It is hereby certified that error appears in the above numbered patent requiring correction and that the said Letters Patent should read as corrected below.

In the grant, lines 2 and 12, and in the heading to the printed specification, line 5, for "Kurashi Rayon Company Limited", each occurrence, read -- Kurashiki Rayon Company Limited --.

Signed and sealed this 28th day of September 1965.

(SEAL)
Attest:

ERNEST W. SWIDER                              EDWARD J. BRENNER
Attesting Officer                                     Commissioner of Patents